No. 879,847. PATENTED FEB. 25, 1908.
T. R. BELL.
SAFETY CONTROLLING MECHANISM.
APPLICATION FILED APR. 11, 1907.
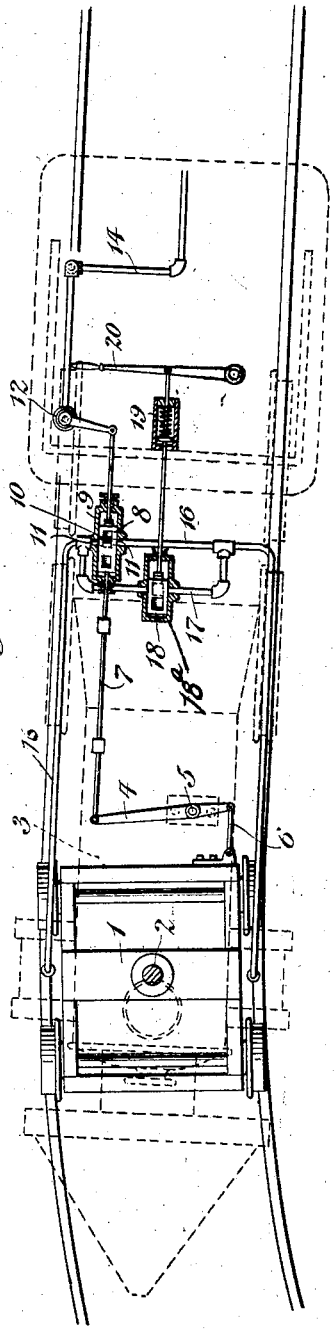
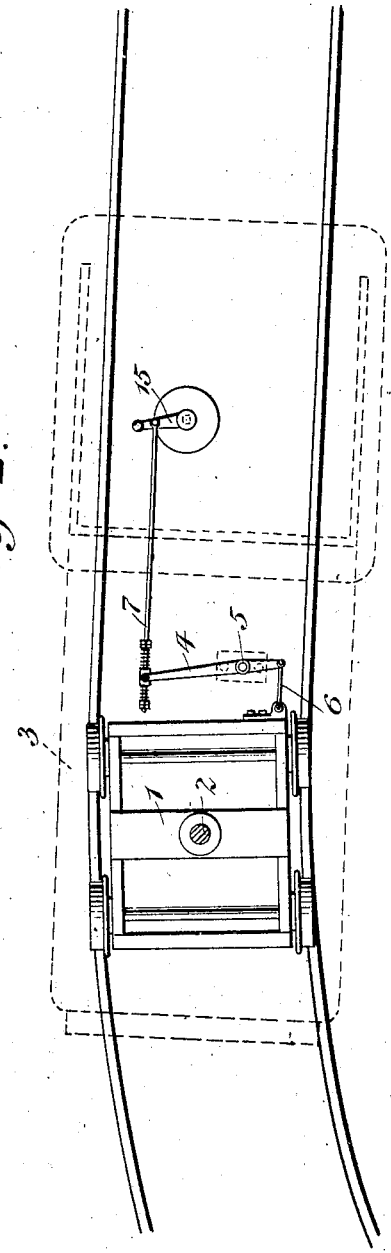

UNITED STATES PATENT OFFICE.

THADDEUS R. BELL, OF NEW YORK, N. Y.

SAFETY CONTROLLING MECHANISM.

No. 879,847.  Specification of Letters Patent.  Patented Feb. 25, 1908.

Application filed April 11, 1907. Serial No. 367,533.

*To all whom it may concern:*

Be it known that I, THADDEUS R. BELL, a citizen of the United States, residing in the city, county, and State of New York, have invented certain new and useful Improvements in Safety Controlling Mechanism, of which the following is a specification.

This invention relates to certain improvements in safety controlling mechanism, such as are particularly designed and adapted for use in connection with locomotive engines, railway and street cars, and other vehicles for lessening the liability of derailment or accident due to the failure of the engineer, motorman or other operative to reduce speed at curves, and the object of the invention is to provide a device of this character of a simple and comparatively inexpensive nature whereby, upon approaching a curve, the speed of the moving vehicle will be automatically controlled and lessened sufficiently to eliminate danger without requiring any particular attention upon the part of the engineer, motorman, or other person in charge.

The invention consists in the employment of mechanism actuated from the horizontal pivotal movement of the truck or axle, relative to the body of the vehicle and connected to actuate the throttle, brakes, controller or other speed controlling part or element of the vehicle, whereby upon approaching a curve, the said mechanism is automatically actuated from such movement of the truck or axle relative to the body of the vehicle and in turn actuates the throttle, brake mechanism, electric controller, or other speed regulating element of the vehicle to reduce the speed within the limit of safety.

The invention also contemplates certain novel features and principles of the construction, and combinations and arrangements of the several parts of the improved safety controlling mechanism, whereby certain important advantages are attained and the device is rendered simpler, cheaper and otherwise better adapted and more convenient for use all as will be hereinafter fully set forth.

The novel features of the invention will be carefully defined in the claims.

In the accompanying drawings which serve to illustrate my invention Figure 1 is a somewhat diagraphic view showing my improvement applied for use in connection with a locomotive engine, and Fig. 2 is a somewhat diagraphic view showing the improved safety controlling mechanism applied for use in connection with an electric car or the like.

Referring first to Fig. 1, 1 indicates the forward truck of the locomotive, having connection at 2 with the forward end of the body 3 of the engine, to permit pivotal movement of said truck in a horizontal plane beneath the body of the locomotive to enable the same to round curves in the track, and 4 represents a lever, fulcrumed at 5 upon the forward part of the locomotive body, and having connection by means of a link 6 or the like, with the outer part of the truck 1, so that as the latter swings pivotally beneath the body of the locomotive upon encountering a curve in the track, such pivotal movement will be transmitted to the lever 4 to swing the same pivotally in a horizontal direction. The outer free end of lever 4 has connection with the forward end of a rod 7 mounted to slide in bearings along the side portion of the engine at or adjacent to the cab thereof, and said rod carries a valve 8 arranged for reverse sliding movements in a casing 9 to which steam is supplied in any preferred way from the locomotive boiler. The valve 8 has a port 10 which, when the valve is in central position, this being the position of the parts when the locomotive is running upon a straight track and the truck 1 and lever 4 are not pivotally moved, is adapted to permit free and unobstructed flow of steam from the interior of the casing to oppositely arranged ports 11, 11 of the casing 9 and thence, by way of suitable pipe connections 16 to the respective cylinders. This valve casing 9 is inserted in the steam supply from the boilers, after the fashion of a throttle, and the arrangement of the parts is such that when the forward truck encounters a curve in the track, and swings pivotally beneath the locomotive body, its movement will be transmitted to the valve to slide the same lengthwise in one direction or the other along the casing 9 so as to throw its port 10 more or less out of registry with the ports 11, 11 of the casing in such a manner as to automatically cut down the steam supply to the cylinders irrespective of any action on the part of the engineer. By this arrangement, it is obvious that the speed of the locomotive may be automatically reduced within the limits of safety upon the encountering of a curve in the tracks by the employment of my improved controlling mechanism and this result is attained without action on the part of the engineer.

In connection with the controlling mechanism constructed as above described, it is advantageous to provide means whereby the engineer shall be permitted to control the speed of the train in rounding curves, as for instance where heavy trains are being hauled and substantially the full power of the locomotive is required for running even at low speed, or where it is desirable to increase the speed before the forward truck shall have passed the termination of the curve. To permit of this operation, I have shown the steam supply pipes 16, leading to the respective cylinders provided with a by-pass 17 extended across the valve-casing 9, and comprising pipes connected with oppositely arranged ports of an auxiliary valve casing 18ª, said ports being controlled by a valve 18, normally held in position to close said ports with which the pipes of the by-pass communicate by means of a spring 19, but provided with an operating lever 20 whereby the engineer may move the valve against the tension of said spring to open said ports of casing 18ª. The said casing 18ª also has suitable connection with the locomotive boiler to receive steam therefrom and it will be obvious that the engineer may, when desirable, operate the lever 20 to move the valve 18 and open the ports of casing 18ª with which the pipes of the by-pass 17 communicate, so that steam will be supplied from said casing 18ª to the cylinders by way of said by-pass 17 and the pipe connections 16 to permit the engine to run at full speed even when the automatically operated controlling valve 8 is actuated from the turning movement of the forward truck to cut down the steam supply to the cylinders. By this construction the engineer may at any desired time, operate lever 20 to throw the controlling valve out of operation, but as soon as said lever is released, the spring 19 will return the auxiliary valve 18 to closed position.

In Fig. 1 I have also shown the valve rod 7 connected to actuate a release valve 12 controlling the air within the train pipe 14 or other part of the brake mechanism, in such a way that the brakes are automatically set upon the encountering of a curve in the tracks by the forward truck of the locomotive, so that the speed may be reduced also through this agency.

In Fig. 2 I have shown the application of my improvements to a motor vehicle, the arrangement being similar to that above described except that the rod 7 is connected to actuate the lever 15 of the electric controller in such a way that when the forward truck encounters a curve in the track, the current supply to the motors is automatically reduced to bring the speed within the limit of safety.

From the above description it will be apparent that the safety controlling mechanism embodying my improvements is of an extremely simple and inexpensive nature and is particularly well adapted for use by reason of the automatic character of its operation, whereby the speed of the moving vehicle is reduced within the limit of safety at curves without requiring any particular action on the part of the engineer, motorman or other person in charge, and it will also be obvious from the above description that the mechanism is capable of considerable modification without material departure from the principles and spirit of the invention, and for this reason I do not desire to be understood as limiting myself to the precise form and arrangement of the parts herein set forth in carrying out my invention in practice. Nor do I desire to be understood as limiting myself to the employment of my improvement exclusively in connection with any particular class of vehicles, since it is evident that the feature of automatic control renders the mechanism suitable for employment in connection with all classes of propelled vehicles.

Having thus described my invention, I claim—

1. The combination of a vehicle having an axle mounted for pivotal movement in a horizontal plane, propelling means for the vehicle, and mechanism actuated from the pivotal movement of the axle and arranged to control the operation of said propelling means.

2. The combination of a vehicle having an axle mounted for pivotal movement in a horizontal plane, an engine arranged to propel the vehicle and provided with a steam supply, a valve controlling said steam supply and mechanism actuated from the pivotal movement of the axle and arranged to control the operation of said valve.

3. The combination of a vehicle having an axle mounted for pivotal movement in a horizontal plane, propelling means for the vehicle, brake mechanism, and mechanism actuated from the pivotal movement of the axle and arranged to operatively control the propelling and brake mechanism of the vehicle.

4. The combination of a vehicle having an axle mounted for pivotal movement in a horizontal plane, electrically actuated propelling mechanism, a controller arranged to control the electric supply of said propelling mechanism, and mechanism actuated from the pivotal movement of the axle and connected to operate said controller.

5. The combination of a vehicle having an axle mounted for pivotal movement in a horizontal plane, propelling means for the vehicle, mechanism actuated from the pivotal movement of the axle and arranged to control the operation of the propelling means, and means, independent of said controlling mechanism and arranged to control the propelling means.

In witness whereof I have hereunto signed my name this 8th day of April 1907, in the presence of two subscribing witnesses.

THADDEUS R. BELL.

Witnesses:
    J. D. CAPLINGER,
    H. G. HOSE.